US005467450A

United States Patent [19]

Coelho

[11] Patent Number: 5,467,450

[45] Date of Patent: Nov. 14, 1995

[54] PROCESS AND APPARATUS FOR CHARACTERIZING AND ADJUSTING SPATIAL RELATIONSHIPS OF DISPLAYED OBJECTS

[75] Inventor: Rohan Coelho, Hillsboro, Oreg.

[73] Assignee: Intel Corporation, Santa Clara, Calif.

[21] Appl. No.: 182,743

[22] Filed: Jan. 14, 1994

[51] Int. Cl.$^6$ .......... G06F 15/20

[52] U.S. Cl. .......... 395/155

[58] Field of Search .......... 395/155, 157, 395/158, 153, 133, 161, 164; 345/113, 114, 115, 119, 120

[56] References Cited

U.S. PATENT DOCUMENTS

| | | | |
|---|---|---|---|
| 4,107,780 | 8/1978 | Grimsdale et al. | 364/521 |
| 4,542,376 | 9/1985 | Bass et al. | 340/724 |
| 4,700,320 | 10/1987 | Kapur | 364/521 |
| 4,769,636 | 9/1988 | Iwami et al. | 340/724 |

*Primary Examiner*—Phu K. Nguyen
*Attorney, Agent, or Firm*—Steve Mendelsohn; William H. Murray

[57] ABSTRACT

Processes and apparatuses for characterizing the spatial relationship of two displayed objects. Differences between pairs of coordinates of the two objects are generated. The differences are sequentially stored as binary values in the lower half of a data register and shifted left one bit to preserve the most significant bit of each difference in the upper half of the register. The spatial relationship between the two objects is characterized by accessing a lookup table using a table index, where the table index is the shifted bits in the register's upper half (i.e., a value corresponding to the MSBs of the coordinate differences).

21 Claims, 3 Drawing Sheets

PROCESS AND APPARATUS FOR CHARACTERIZING AND ADJUSTING SPATIAL RELATIONSHIPS OF DISPLAYED OBJECTS

BACKGROUND OF THE INVENTION

1. Field of the Invention

The present invention relates to image processing, and, in particular, to processes and apparatuses for characterizing and adjusting the spatial relationships between displayed objects.

2. Description of the Related Art

Window-based computer systems display visual output in windows on a display monitor. A given window may overlap with or even completely cover one or more other windows. In order to coordinate the display of multiple windows within the display raster of a display monitor, conventional computer systems characterize the spatial relationships between the various windows. Such characterizations may be used to determine whether two or more windows overlap and, if so, how they overlap.

Referring now to FIG. 1, there is depicted the seventeen different possible types of spatial relationships between two rectangular windows in a display raster. The thick-lined rectangle represents a particular window in the display raster. The seventeen thin-lined and dashed-lined rectangles represent seventeen other windows in the display raster that demonstrate the seventeen different types of spatial relationships that rectangular windows can have with the thick-lined window. Note that window 17 represent the general no-overlap condition.

Referring now to FIG. 2, there is shown a display raster 200 containing two overlapping rectangular windows W1 and W2. Conventional computer systems characterize the spatial relationship between windows by implementing sequences of comparisons between the coordinates of the windows and then basing the characterization upon the results of those comparisons. In order to determine the type of overlap that exists, a conventional computer system may independently compare each of the four coordinates L2, R2, T2, and B2 of window W2 of FIG. 2 to the two corresponding coordinates of window W1. For example, coordinate L2 of window W2 may be independently compared to coordinates L1 and R1 of window W1.

These independent comparisons may then be combined to determine the type of overlap that exists. For example, as depicted in FIG. 2, if:

(L1<L2) AND (L2<R1) AND
(T1<T2) AND (T2<B1) AND
(L1<R2) AND (R2>R1) AND
(T1<B2) AND (B2>B1)

then overlap type 9 of FIG. 1 exists, where window W1 of FIG. 2 corresponds to the thick-lined window of FIG. 1 and window W2 corresponds to dashed-lined window 9.

Some conventional window-based computer systems are based on pipelined processors. Pipelined processors fetch and pre-process one or more subsequent instructions while the current instruction is executing. When the address of the next instruction is predetermined, this pipelining approach provides improved processor performance over a sequential approach in which the fetching and pre-processing of the next instruction does not begin until the execution unit completes the execution of the current instruction. In the sequential approach, the execution unit then idly waits while the next instruction is being fetched and pre-processed.

Conditional jumps disrupt pipelined processing. If the condition is met, then the address of the next instruction to be executed by the processor will not follow the current instruction. In that case, the current fetch and pre-process queue is flushed and the execution unit idly waits until the correct next instruction is fetched and pre-processed.

In a conventional window-based computer system, the characterization of the spatial relationship between two windows in a display raster is implemented as a sequence of comparisons between coordinates of the two windows with a conditional jump after each comparison. A single characterization of spatial relationship may involve several conditional jumps, each of which disrupts the pipelined processing and thereby reduces processor efficiency. In addition, conventional computer systems may repeat the same window coordinate comparisons in different combinations to characterize the spatial relationship between the same two windows. This also contributes to processor inefficiency.

What is needed is a window-based computer system with a pipelined processor that characterizes the spatial relationship between windows in a display raster without unnecessarily decreasing processor efficiency.

It is accordingly an object of this invention to overcome the limitations of the known art and to provide a window-based computer system that characterizes the spatial relationship between windows in a display raster without unnecessarily decreasing the efficiency of the pipelined processor.

It is a further object of this invention to provide improved processes and apparatuses for characterizing the type of overlap between two windows in a display raster.

It is a further object of this invention that the number of coordinate comparisons and the number of conditional jumps involved in characterizing window overlap be minimized.

It is a general object of this invention to provide processes and apparatuses for characterizing and adjusting the spatial relationship between displayed objects.

Further objects and advantages of this invention will become apparent from the detailed description of a preferred embodiment which follows.

SUMMARY OF THE INVENTION

The present invention is a computer-implemented process and an apparatus for transforming signals corresponding to displayed objects. A first signal corresponding to a first displayed object is provided, where the first signal comprises a plurality of digital first object coordinates. A second signal corresponding to a second displayed object is also provided, where the second signal comprises a plurality of digital second object coordinates. A plurality of differences between the first object coordinates and the second object coordinates are generated. A table index is generated from the most significant bits of the plurality of differences. The spatial relationship between the first and second displayed objects is then characterized by accessing a lookup table in accordance with the table index. At least one of the first and second signals is then transformed in accordance with the spatial relationship characterization.

The present invention is also an apparatus for characterizing the spatial relationship of two displayed objects. The apparatus comprises a memory device for storing signals corresponding to the two objects and for storing a lookup table corresponding to the spatial relationship between the two objects. The apparatus also comprises a processor that (1) generates a table index from the most significant bits of a plurality of differences between a plurality of pairs of coordinates of the two objects and (2) characterizes the spatial relationship by accessing the lookup table in the memory device in accordance with the table index.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention is directed to processes and apparatuses for characterizing the spatial relationship between two displayed objects (e.g., rectangular windows). According to a preferred embodiment of the present invention, a table index is generated from the most significant bits (MSBs) of the differences between pairs of coordinates of the two objects. The spatial relationship between the two windows is then retrieved from a lookup table using the table index.

Figure 3:
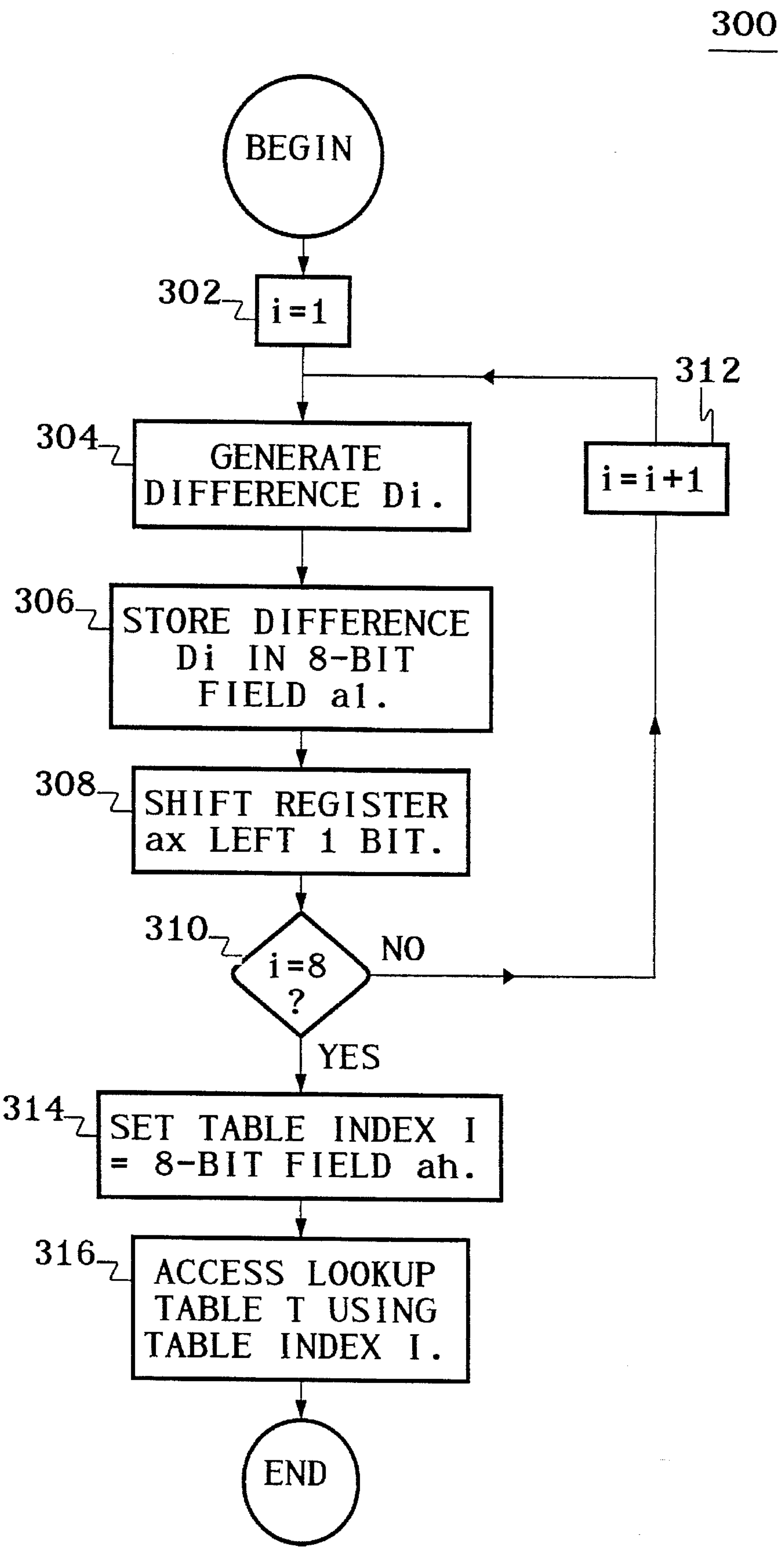
FIG. 3 is a process flow diagram of the processing implemented by a computer system according to a preferred embodiment of the present invention in characterizing the spatial relationship between two rectangular windows in a raster display.

Referring now to FIG. 3, there is shown a process flow diagram of the processing implemented by computer system 300 to characterize the spatial relationship between two rectangular windows in a raster display, according to a preferred embodiment of the present invention. In a preferred embodiment, computer system 300 is a personal computer system with a pipelined processor, a memory device, and a display monitor. The pipelined processor is preferably an Intel®×86 processor, where an Intel®×86 processor is either an Intel®386, 486, or Pentium® processor. The memory device may be any device suitable for storing image data and lookup tables, such as a DRAM or VRAM. The display monitor may be any device suitable for displaying graphics and video images.

Figure 1:
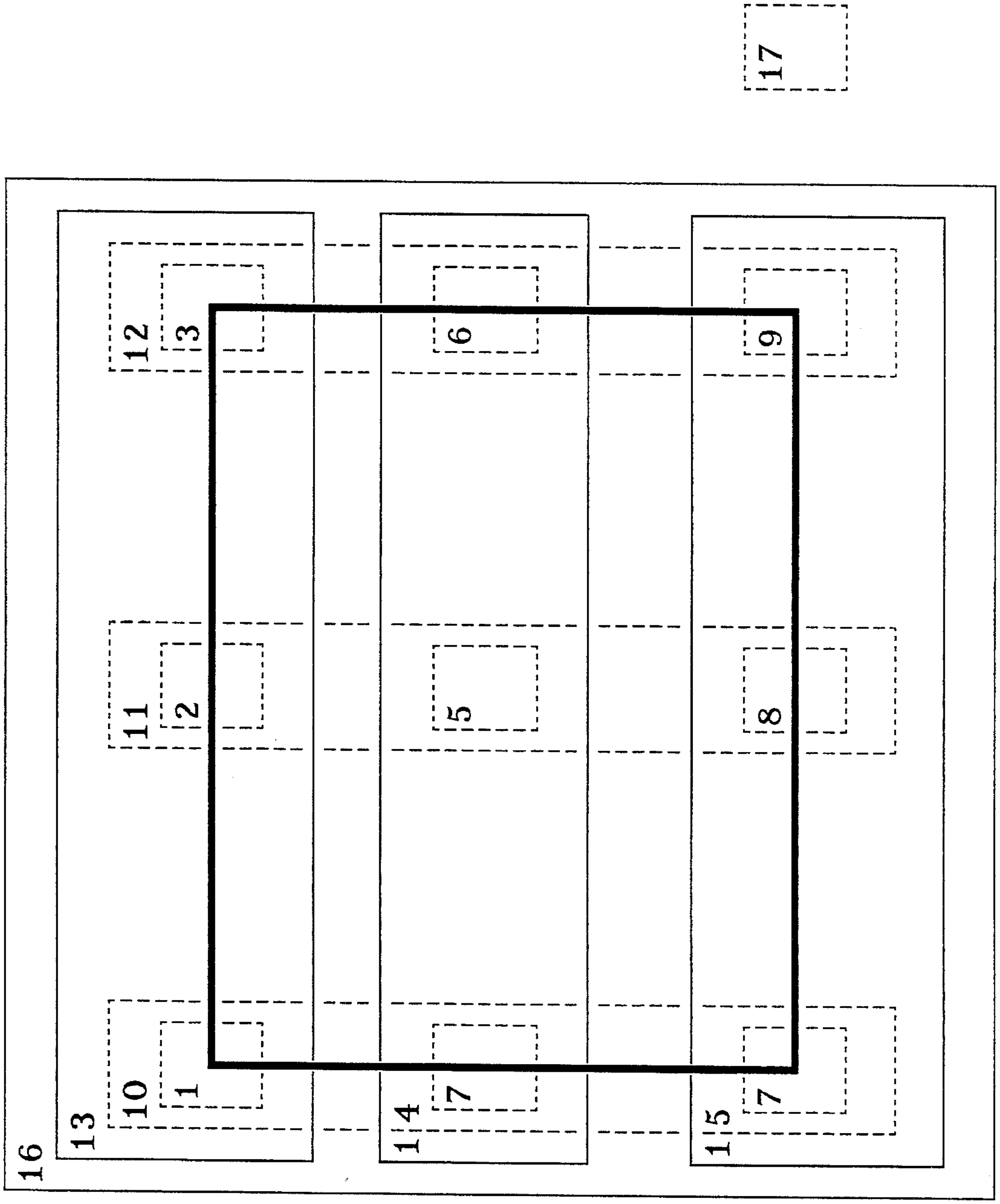
FIG. 1 depicts the seventeen different possible types of spatial relationships between two rectangular windows in a display raster.
Figure 2:
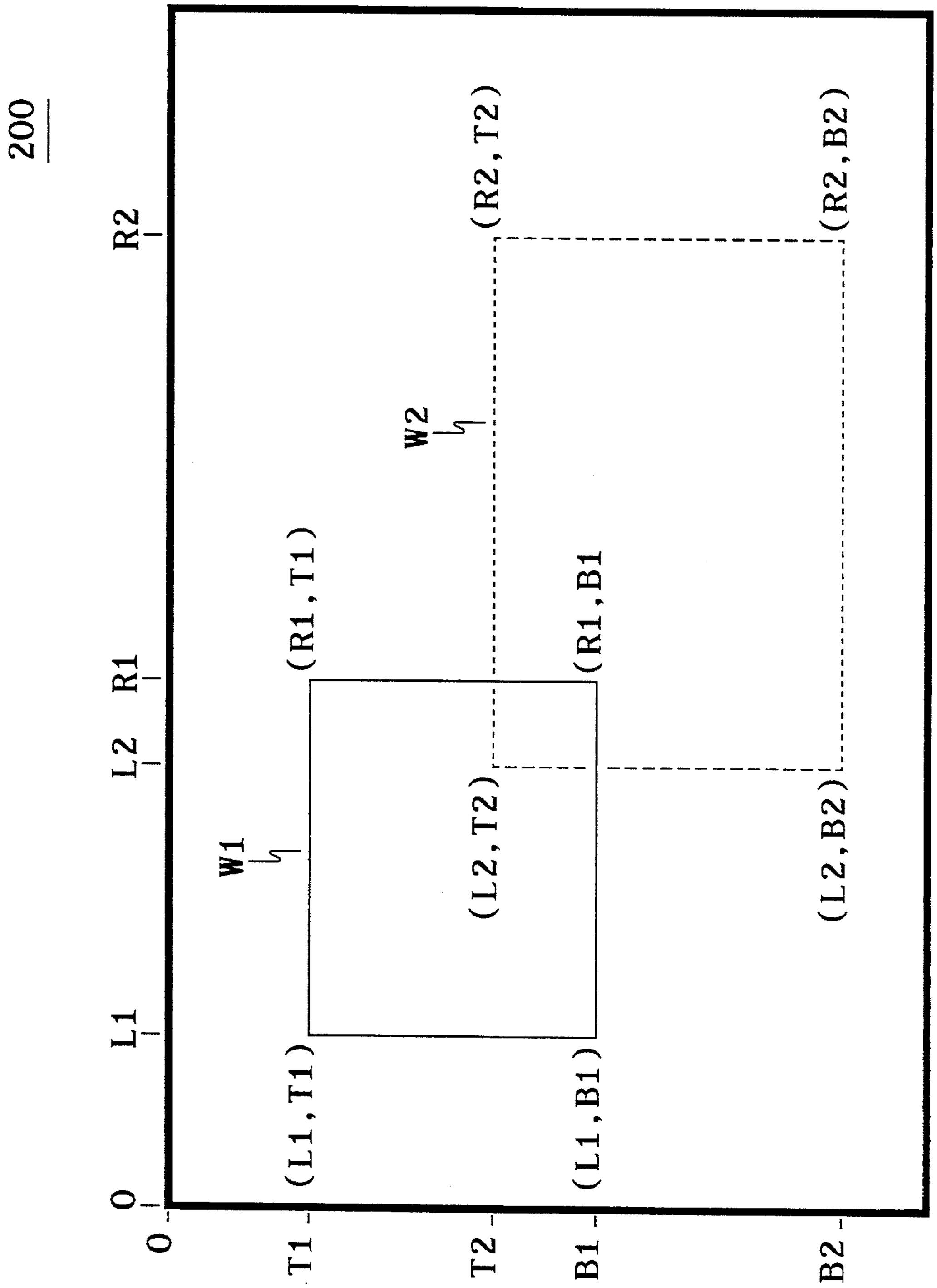
FIG. 2 shows a display raster containing two overlapping rectangular windows.

Using the variables of FIG. 2, when the two displayed objects are both rectangular windows, computer system 300 sequentially generates the following eight coordinate differences Di:

D1=L1−L2
D2=R1−L2
D3=L1−R2
D4=R1−R2
D5=T1−T2
D6=B1−T2
D7=T1−B2
D8=B1−B2

The MSBs of these eight differences Di are then used to generate the table index for the lookup table that contains the various types of spatial relationships.

In particular, means 304 of computer system 300 generates difference Di. Difference Di is preferably an 8-bit signed binary value, where the MSB of Di is 0 when Di is non-negative (i.e., either positive or zero) and 1 when Di is negative. Means 306 stores difference Di in the lower 8-bit field (e.g., field al) of a 16-bit register (e.g., register ax). Means 308 then shifts register ax left one bit, thereby shifting the MSB of difference Di to the least significant bit (LSB) of the upper 8-bit field ah of register ax.

Blocks 302, 310, and 312 are presented in FIG. 3 to indicate that the processing of means 304, 306, and 308 is implemented eight times for the eight differences D1–D8. Blocks 302, 310, and 312 do not necessarily represent processing steps implemented by computer system 300. In a preferred embodiment, means 304, 306, and 308 are implemented eight times by a sequence of explicit, consecutive processor instructions for differences D1–D8.

After all eight differences have been sequentially generated, stored, and shifted by means 304, 306, and 308, respectively, 8-bit field ah of register ax contains the eight MSB's of the eight differences D1–D8. Means 314 sets table index I equal to the value in field ah. Means 316 then uses table index I as the index to lookup table T to retrieve the proper characterization of the spatial relationship between the two rectangular windows.

Those skilled in the art will understand that each possible table index I corresponds to a single type of spatial relationship. For example, referring again to windows W1 and W2 of FIG. 2, the differences D1–D8 are such that:

$D1=(L1-L2)<0 \Rightarrow$ MSB of $D1=1$
$D2=(R1-L2)>0 \Rightarrow$ MSB of $D2=0$
$D3=(L1-R2)<0 \Rightarrow$ MSB of $D3=1$
$D4=(R1-R2)<0 \Rightarrow$ MSB of $D4=1$
$D5=(T1-T2)<0 \Rightarrow$ MSB of $D5=1$
$D6=(B1-T2)>0 \Rightarrow$ MSB of $D6=0$
$D7=(T1-B2)<0 \Rightarrow$ MSB of $D7=1$
$D8=(B1-B2)<0 \Rightarrow$ MSB of $D8=1$ In this example, index value I has the 8-bit binary value (1011 1011). The entry in lookup table T corresponding to index value I=(1011 1011) indicates that overlap type 9 exists.

Depending on the particular situation, after the spatial relationship has been characterized, an appropriate operation may be implemented. For example, computer system 300 may determine the union, difference, or intersection of the two windows. Computer system 300 may then generate and display an updated image on a display monitor based on the characterization, for example, by changing the overlapping of windows in the display raster. It will be understood by those skilled in the art that other operations may be performed under the present invention.

Those skilled in the art will understand that, in alternative preferred embodiments of the present invention, the spatial relationship between displayed objects other than two rectangular windows may be characterized. For example, a rectangular window and a triangular window have a finite number of different types of spatial relationship. A computer system according to the present invention may therefore be designed to characterize the spatial relationship between two such windows.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for transforming signals corresponding to displayed objects, comprising the steps of:

(a) providing a first signal corresponding to a first displayed object, the first signal comprising a plurality of digital first object coordinates;

(b) providing a second signal corresponding to a second displayed object, the second signal comprising a plurality of digital second object coordinates;

(c) generating a plurality of differences between the first object coordinates and the second object coordinates;

(d) generating a table index from the most significant bits of the plurality of differences;

(e) characterizing the spatial relationship between the first and second displayed objects by accessing a lookup table in accordance with the table index; and (f) transforming at least one of the first and second signals in accordance with the spatial relationship characterization.

2. The process of claim 1, further comprising the steps of:

(g) displaying the signals generated in step (f).

3. The process of claim 1, wherein step (f) comprises the step of transforming at least one of the first and second signals in accordance with the union of the two objects.

4. The process of claim 1, wherein step (f) comprises the step of transforming at least one of the first and second signals in accordance with the difference of the two objects.

5. The process of claim 1, wherein step (f) comprises the step of transforming at least one of the first and second signals in accordance with the intersection of the two objects.

6. The process of claim 1, wherein step (c) comprises the steps of:

(1) generating a difference between one of the first object coordinates and one of the second object coordinates;

(2) storing the difference as an n-bit binary value in an m-bit register of a processor, where n is less than m;

(3) shifting the bits of the m-bit register left one bit; and (4) repeating steps (c)(1)–(c)(3) for one or more additional pairs of coordinates of the first and second objects; and wherein step (d) comprises the step of generating the table index in accordance with the shifted bits of the m-bit register.

7. The process of claim 6, wherein:

each of the first and second objects comprises a rectangular window;

n equals eight;

m equals sixteen;

step (c)(2) comprises the step of storing the difference as an 8-bit binary value in a 16-bit register of a processor;

steps (c)(1)–(c)(3) are implemented for eight pairs of coordinates of the two rectangular windows; and step (d) comprises the step of generating an 8-bit table index in accordance with the shifted bits of the 16-bit register.

8. An apparatus for transforming signals corresponding to displayed objects, comprising:

(a) means for providing a first signal corresponding to a first displayed object, the first signal comprising a plurality of digital first object coordinates;

(b) means for providing a second signal corresponding to a second displayed object, the second signal comprising a plurality of digital second object coordinates;

(c) means for generating a plurality of differences between the first object coordinates and the second object coordinates;

(d) means for generating a table index from the most significant bits of the plurality of differences;

(e) means for characterizing the spatial relationship between the first and second displayed objects by accessing a lookup table in accordance with the table index; and (f) means for transforming at least one of the first and second signals in accordance with the spatial relationship characterization.

9. The apparatus of claim 8, further comprising:

(g) means for displaying the signals generated by means (f).

10. The apparatus of claim 8, wherein means (f) comprises means for transforming at least one of the first and second signals in accordance with the union of the two objects.

11. The apparatus of claim 8, wherein means (f) comprises means for transforming at least one of the first and second signals in accordance with the difference of the two objects.

12. The apparatus of claim 8, wherein means (f) comprises means for transforming at least one of the first and second signals in accordance with the intersection of the two objects.

13. The apparatus of claim 8, wherein means (c) comprises:

(1) means for generating a difference between one of the first object coordinates and one of the second object coordinates;

(2) means for storing the difference as an n-bit binary value in an m-bit register of a processor, where n is less than m; and (3) means for shifting the bits of the m-bit register left one bit, wherein the processing of means (c)(1)–(c)(3) is repeated for one or more additional pairs of coordinates of the first and second objects; and wherein means (d) comprises means for generating the table index in accordance with the shifted bits of the m-bit register.

14. The apparatus of claim 13, wherein:

each of the first and second objects comprises a rectangular window;

n equals eight;

m equals sixteen;

means (c)(2) comprises means for storing the difference as an 8-bit binary value in a 16-bit register of a processor;

the processing of means (c)(1)–(c)(3) is implemented for eight pairs of coordinates of the two rectangular windows; and means (d) comprises means for generating an 8-bit table index in accordance with the shifted bits of the 16-bit register.

15. An apparatus for characterizing the spatial relationship of two displayed objects, comprising:

(a) a memory device for storing signals corresponding to the two objects and for storing a lookup table corresponding to the spatial relationship between the two objects; and (b) a processor, wherein the processor:

generates a table index from the most significant bits of a plurality of differences between a plurality of pairs of coordinates of the two objects; and characterizes the spatial relationship by accessing the lookup table in the memory device in accordance with the table index.

16. The apparatus of claim 15, wherein the processor generates an updated image in accordance with the characterization of the spatial relationship, and further comprising a display monitor for displaying the updated image.

17. The apparatus of claim 16, wherein the processor generates the updated image corresponding to the union of the two objects.

18. The apparatus of claim 16, wherein the processor generates the updated image corresponding to the difference of the two objects.

19. The apparatus of claim 16, wherein the processor generates the updated image corresponding to the intersection of the two objects.

20. The apparatus of claim 15, wherein the processor:

generates the difference between a pair of coordinates of the two objects, the processor comprising an m-bit register for storing the difference as an n-bit binary value, where n is less than m;

shifts the bits of the m-bit register means left one bit; and generates a table index in accordance with the shifted bits of the m-bit register means.

21. The apparatus of claim 20, wherein:

each of the two objects comprises a rectangular window;

n equals eight;

m equals sixteen;

the register of the processor comprises 16 bits for storing the difference as an 8-bit binary value; and the processor generates an 8-bit table index in accordance with the shifted bits of the 16-bit register.

* * * * *